United States Patent [19]

Loughley et al.

[11] 4,183,457
[45] Jan. 15, 1980

[54] SHRINK TAPE CLOSURE

[75] Inventors: William A. Loughley, Twinsburg; Lewis L. Otterson, Chagrin Falls, both of Ohio

[73] Assignee: Weatherchem Corporation, Twinsburg, Ohio

[21] Appl. No.: 932,209

[22] Filed: Aug. 9, 1978

[51] Int. Cl.² .......................... B65D 3/10; B65D 5/00; B65D 13/00
[52] U.S. Cl. ........................................ 229/5.5; 229/43; 220/359
[58] Field of Search ................... 229/43, 5.5; 220/359, 220/67, 366

[56] References Cited

U.S. PATENT DOCUMENTS

| 2,623,685 | 12/1952 | Hill | 229/5.5 X |
| 3,722,732 | 3/1973 | Edlund | 229/5.5 X |
| 3,734,393 | 5/1973 | Stump | 229/5.5 X |
| 3,809,280 | 5/1974 | Park et al. | 220/366 X |
| 3,997,056 | 12/1976 | Muelher | 220/359 X |

Primary Examiner—George T. Hall
Attorney, Agent, or Firm—Pearne, Gordon, Sessions

[57] ABSTRACT

An end closure cap for a tape sealed assembly with a cylindrical shell. The closure cap is characterized by a deep dish construction having a high degree of dimensional adaptability making it particularly suited for use with composite shells manufactured with relatively wide dimensional tolerances. The cap includes flared and beveled surfaces which make it self-aligning to the shell and elements which, until completion of the application of a sealing shrink tape, allow escape of air from the shell to facilitate high speed automatic closing of the assembly.

8 Claims, 7 Drawing Figures

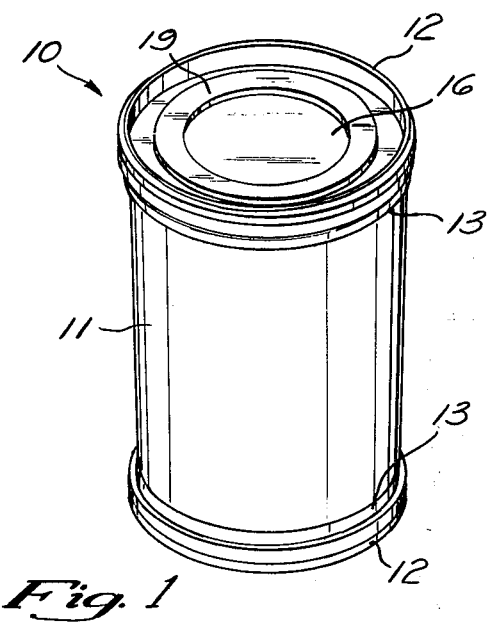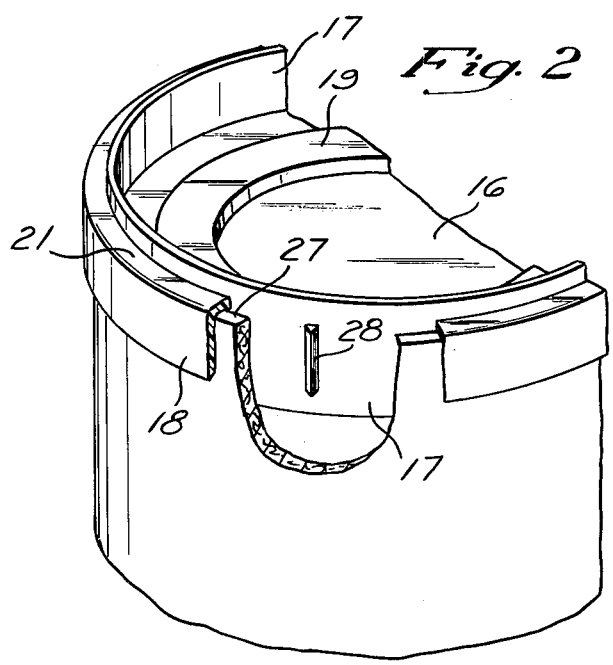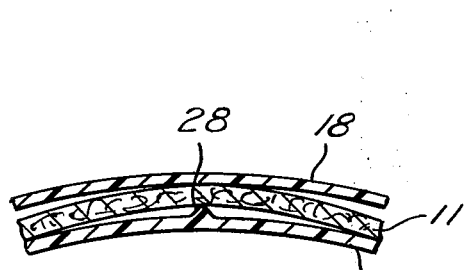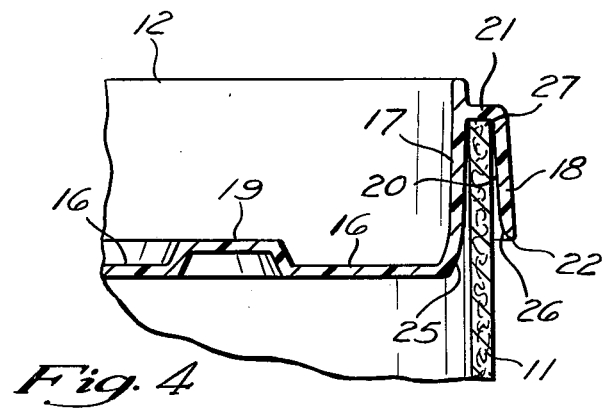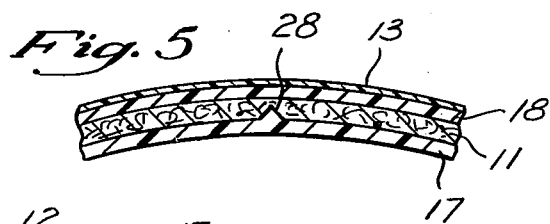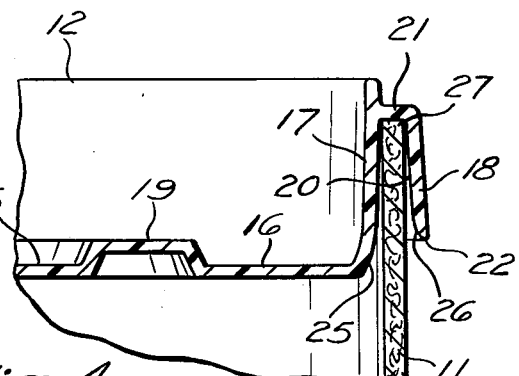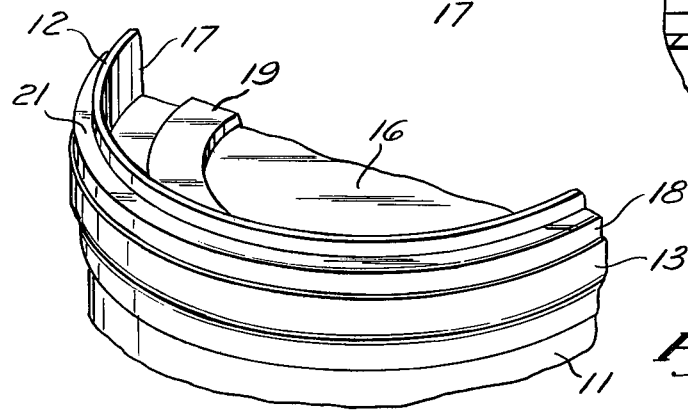

SHRINK TAPE CLOSURE

BACKGROUND OF THE INVENTION

The invention relates to canister assemblies or like containers and in particular to end closures for cylindrical canisters.

PRIOR ART

In the packaging of bulk goods, such as certain food products, for retail trade, for example, it is important that a container assembly be capable of developing and maintaining a relatively secure, hermetic seal at its closure to prevent product spoilage. Cylindrical composite container shells of cardboard and the like are commonly used, due at least in part to their relative economy. End closure, referred to as "caps," are secured to each end of a composite shell to form a container. It is known, for example, from U.S. Pat. Nos. 3,396,899; 3,437,257; and 3,516,852 to secure and seal these caps to the shell with an adhesive-coated plastic tape. U.S. Pat. Nos. 3,923,198 and 3,997,056, for instance, disclose the use of heat shrinkable adhesive tape to improve the circumferential seal afforded by a tape.

Ordinarily, dimensional tolerances involved in the manufacture of composite shells are inherently relatively large and are generally not easily avoided without incurring the penalty of increased cost. Size variation in composite shells may limit the effectiveness and reliability of the seal that a cap is capable of developing because of a resulting poor fit between the cap and shell.

A problem often encountered by a consumer is the tendency of the mouth or peripheral edge of the composite shell, once opened, to become distorted through local crushing, kinking, bending, delaminating, or the like. As a result of their relative dimensions and geometry, caps of prior art designs may have a low adaptability to such shell edge damage, and they may become difficult to reinstall when it is desired to protect or otherwise contain a remaining portion of the containerized product.

SUMMARY OF THE INVENTION

The invention provides an improved closure cap construction having constructional features suited for use with cylindrical composite container shells or similar articles. The closure cap of the invention is characterized by a deep dish construction which is adapted to readily accommodate a dimensional tolerance range normally associated with composite container shells. In accordance with the invention, the primary contact between the cap and shell is developed at an area of the shell immediately adjacent its edge and a wall area of the cap axially displaced from its disc center. Axial separation between the sealing area of the cap and the disc center permits this sealing area to slightly expand or contract radially to fit the dimensions of a particular shell within expected manufacturing tolerances. Complementing the dimensionally compliant nature of the cap is a heat-shrinkable tape seal circumferentially applied across both the cap and shell. Upon heat shrinkage, the tape assures that the cap is tightly secured and hermetically sealed to the shell. In the disclosed embodiment, the cap is provided with concentric, generally axially extending skirts between which is received the shell end. The skirt walls are slightly oppositely flared to guide the cap and associated shell edge into registration. At least one of the skirt walls is provided with protrusion means for delaying the formation of a seal between the cap and shell until substantially all of the air displaced from the shell by the cap is exhausted. The function of the protrusion means is particularly important in use with the deep dish cap configuration, since a relatively large volume of air is necessarily displaced from the shell during placement of the cap.

The shrink tape is effective to constrict the outer skirt into tight sealing engagement with the shell. This constriction further causes the cap to be mechanically locked onto the shell by forcibly driving the protrusion means into the wall of the shell. Additionally, a high degree of elastic deformation of the outer skirt assures that the cap is positively retained by the tape even where the tape is subject to any relaxation. The originally flared configuration of the outer skirt, moreover, by operating in the manner of a reverse taper lock, reduces any tendency of the cap to work away from the tape. This feature is especially important where the cap is formed of a plastic material which has a relatively low coefficient of friction and/or relatively low adhesion properties.

In the disclosed embodiment, the center disc of the cap extends axially beyond the plane of the forward edge of the outer skirt and the adjacent area of the inner skirt is rounded by a substantial increase in its taper angle. Adjacent its forward edge, the outer skirt is also beveled to increase its effective taper angle at this point. The result of this structure is to provide a cap which is self-aligning for initial reliable machine assembly with a shell at high speed and which is readily replaced manually even in cases where the exposed edge of the shell is damaged subsequent to opening.

BRIEF DESCRIPTION OF THE DRAWINGS

FIG. 1 is a perspective view of a canister assembly embodying the invention;

FIG. 2 is a perspective, fragmentary view on an enlarged scale of a portion of the canister assembly with portions cut away to illustrate constructional details;

FIG. 3 is a fragmentary, cross sectional view through a shell sidewall and a cap of the canister assembly;

FIG. 4 is a fragmentary, cross sectional view of the sidewall and cap in a plane parallel to the longitudinal axis of the canister assembly;

FIG. 5 is a view similar to FIG. 3, but with the cap fully secured to the canister shell;

FIG. 6 is a view similar to FIG. 4, also showing the cap fully secured to the canister shell; and FIG. 7 is a fragmentary, perspective view of one end of the canister in its fully assembled condition.

DESCRIPTION OF THE PREFERRED EMBODIMENT

Referring now to the drawing, there is illustrated a canister assembly 10 comprising a cylindrical shell 11, an end closure gap 12 on each end of the shell, and separate bands of tape 13 securing each cap to the shell.

The shell 11 is preferably a thin-walled structure of spirally wound cardboard or other like composite, cellulosic material and constructed in accordance with conventional practices. Ideally, the inner surface of the shell 11 is lined with a metal foil to provide a moisture barrier. The exterior of the shell 11 is desirably covered with a suitable paper or other filmlike material for purposes of appearance and durability.

The end closures or caps 12 are preferably identical, and are circular elements comprising a central disc portion 16, and, at the periphery of this portion, a pair of concentric skirts 17 and 18. The central disc portion 16 forms a deep dish configuration with the inner skirt 17. The central disc portion 16 can be imperforate or can be provided with one or more sealed apertures for dispensing, if desired. Each end closure or cap 12 is preferably injection-molded of polypropylene or other suitable non-toxic, synthetic, thermoplastic material. The central disc portion 16 is generally planar with the exception of an intermediate annular embossment 19, which serves to stiffen the cap 12.

As indicated most clearly in FIG. 4, the concentric skirts 17, 18 each extend primarily in an axial direction, that is, with reference to an imaginary central axis of the disc portion 16, and form an annular channel 20 for reception of an end of the shell 11. The outer skirt or wall 18 is slightly conical, increasing to a limited degree in diameter in a forward direction, i.e., in the direction of the central disc portion 16. At its rearward end, the outer skirt 18 is integrally joined to the inner skirt 17 by a circumferential web 21. The inner skirt wall 17 is conical, to the same or a lesser degree than the outer skirt 18 in an opposite direction from the outer skirt 18, so that it decreases slightly in diameter in a direction toward the central disc portion 16. The central disc portion 16 and concentric skirts 17,18 all have substantially the same wall thickness.

The plane of the main body of the central disc portion 16 extends forwardly of a lead edge 22 of the outer skirt 18. At its forward end, the inner skirt turns radially inwardly to provide a flared surface 25 for piloting the cap 12 onto the shell 11. As indicated, the flared surface 25 is offset at its inwardmost point radially a distance from the nominal outside diameter of the inner wall 17 a distance at least equal to the nominal wall thickness of the shell 11. The radially inward side of the forward end 22 of the outer skirt wall 18 is beveled at 26 to increase the inner diameter of the outer skirt wall at this point for facilitating entry therein of the shell end, designated 27. The cap 12 is fully positioned on the shell when the shell edge 27 abuts the web 21, which thereafter axially restrains further inward cap movement.

The closure tape 13 is coated on its inner face with a pressure-sensitive adhesive and is shrinkable upon application of heat. A suitable tape is marketed under the trademark "Secur-a-Seal," registered to 3M Company, St. Paul, Minnesota 55101. The tape 13 is preferably applied in strip form by wrapping it circumferentially about the shell 11 and cap 12, with its ends slightly overlapping and with its width bridging a major portion of the outer skirt wall 18, as well as a like axial length of the outer surface of the shell. With the tape 13 wrapped and self-adhered to the outer skirt 18 and shell 11, application of heat induces a shrinkage in the tape so that the outer skirt 18 is drawn tightly against the outer surface of the shell from the position of FIG. 4 to that of FIG. 6.

At four evenly spaced circumferential locations, a set of ribs 28 are integrally formed on the inner skirt wall 17. The ribs 28 extend radially into the channel 20 and axially along the major length of the inner skirt wall 17, at least to the point where this wall forms the flared portion 25. The ribs 28 prevent a gas seal from forming between the shell 11 and cap 12 until application of heat to the shrink tape 13. As indicated in FIG. 3, each rib 28 temporarily slightly deforms the shell 11 from a true cylinder so that the shell does not snugly fit the skirt walls 17,18 about its full circumference. The projecting ribs 28 thereby allow the cap 12 to be assembled on the shell 11 at high speed, since air in the shell is allowed relatively free axial escape through unseated areas between the shell and cap skirt walls 17,18. This feature is particularly desirable with the deep dish structure of the cap 12, since when assembling the last cap on a shell a volume of air approximately equal to the diameter of the central disk 16 multiplied by the length of the inner skirt 17 must be exhausted. Upon application of heat to the shrink tape 13, the outer skirt wall 18 is drawn radially inwardly by circumferential tightening of the tape and sufficient force is developed to locally embed each rib 28 into an adjacent area of the shell 11 so as to return the shell to a cylindrical form and allow the skirt walls to circumferentially continuously embrace the inner and outer surfaces of the shell 11. As shown, the ribs 28 have a tapered or triangular profile in a plane transverse to the axis of the central disc 16 to enable them to readily embed themselves into the wall of the shell 11 with a limited tightening force applied by the tape 13. In addition to eliminating the risk of a premature air seal, the ribs 28, once they are driven into the shell 11, mechanically lock the cap 12 to the shell 11.

The disclosed closure cap 12 has the advantage of being well-suited for use with composite container shells, since it has a relatively high acceptance for wide dimensional variations in the shell as a result of its deep dish construction wherein the plane of the central disc portion 16 is axially displaced inwardly of the concentric skirt walls 17,18. This construction permits the skirt walls 17,18 to flex radially inwardly or outwardly, depending on what is required by a particular shell, without undue restriction to such movement by the central disc portion.

The cap 12 is preferably formed of a relatively elastic material, such as polypropylene. The outer skirt 18 is maintained in a radially compressed state by the tape 13 once the latter has been heat shrunk. Even where the tape 13 relaxes slightly, the natural tendency of the resilient skirt to expand radially to relieve stresses therein assures that tight engagement will be maintained between the tape and outer surface of the outer skirt. This tendency of the outer skirt 18 to expand to its original position, indicated in FIG. 4, is helpful in maintaining sealing engagement between the tape and cap where the material has a relatively low coefficient of friction and/or has relatively low adhesive properties. A slight conical orientation of the outer skirt 18, moreover, provides a reverse taper lock with the tape 13 tending to mechanically resist movement of the cap axially off the shell.

The axially protruding relation of the central disc portion 16 to the outer skirt 18 and the flared and beveled areas 25 and 26 of the inner and outer skirt walls 17 and 18 combine to afford a cap structure which is readily indexed to the end 27 of the shell. This self-indexing feature of the cap contributes to its ability to be assembled to the shell in high speed container filling and closing machinery. The projecting central disc and flared and beveled skirt areas are similarly operative to facilitate repositioning of the cap on the shell after initial removal of the cap. This structure is effective to guide the cap on a shell end, even though such end has been inadvertently multilated by delamination, crushing, kinking, or other distortion from its original cylindrical shape.

Although a preferred embodiment of this invention is illustrated, it should be understood that various modifications and rearrangements of parts may be resorted to without departing from the scope of the invention disclosed and claimed herein. For example, a single cap of the disclosed type can be used on one end of a container having an integral or separate type closure at the opposite end.

What is claimed is:

1. A canister assembly comprising a thin-walled cylindrical shell and a cap forming a closure at one end of the shell, said cap having a central disc portion extending across a major portion of the end face of the shell and a pair of concentrically arranged inner and outer skirts, said central disc portion having a major portion defining a plane, said skirts being integrally formed on the circumference of said disc portion and extending axially rearwardly of said central disc portion, a forwardmost edge of said outer skirt being axially spaced rearwardly from said disc plane, the inner surface of said outer skirt and the outer surface of said inner skirt together forming an annular channel in which an end of the shell is received, said skirts being constructed and arranged such that substantially all of the area of said inner and outer skirt surfaces contact said shell at respective points axially spaced from said disc plane whereby said inner and outer skirts are relatively free of radial restriction by said central disc portion so that said skirts are capable of accommodating expected dimensional variations in the actual size of the shell by radial deformation thereof, said outer skirt having a free, slightly conical configuration flaring radially outwardly in an axially forward direction, a sealing tape circumferentially wrapped about the outer surface of said outer skirt and axially bridging said forwardmost edge in a manner whereby a portion of its axial extent contacts said outer skirt and a major part of the remaining portion of its axial extent contacts the outer cylindrical surface of said shell, said tape being circumferentially tensioned a sufficient degree to constrict said outer skirt from its free conical configuration to a substantially cylindrical configuration against the outer cylindrical surface of said shell.

2. A canister assembly as set forth in claim 1, wherein said outer skirt is beveled at its axially forward edge to increase its effective inside diameter.

3. A canister assembly as set forth in claim 2, wherein said inner skirt flares radially inwardly in an axially forward direction to decrease its outside diameter.

4. A canister assembly as set forth in claim 3, wherein said inner skirt includes a zone adjacent said central disc portion which flares radially inwardly at a rate substantially greater than that of a remaining major portion of the axial length of said inner skirt.

5. A canister assembly as set forth in claim 4, wherein said outer skirt is spaced from said central disc plane a distance generally equal to the axial length of said radially flared zone of said skirt.

6. A canister assembly as set forth in claim 1, wherein said tape is adhesive-coated and is heat shrinkable in place on said outer skirt.

7. A canister assembly as set forth in claim 6, wherein one of said skirts includes protrusion means extending into said annular channel, said protrusion means being arranged to prevent a gastight seal from being developed between said cap and said shell.

8. A container assembly comprising a shell and a pair of end closure caps on the shell, said shell being a cylindrical thin-walled structure of composite material such as cardboard, said caps being substantially identical injection-molded circular units of thermoplastic material, each cap including a central disc portion extending across a major portion of the end face of the shell for placement within the shell, each cap including a pair of concentric generally axially extending skirts, an inner one of said skirts being disposed within said shell and an outer of said skirts being disposed about the outer circumference of said shell, said skirts being circumferentially joined by a radially extending web therebetween, each end of said shell being abutted with the web of a respective cap, each cap having a plurality of axially extending ribs circumferentially spaced on the outer side of the inner skirt, a heat shrinkable tape circumferentially disposed about the outer skirt and an adjacent area of the outer surface of the shell at each cap, heat-induced shrinkage of said tape circumferentially constricting the respective shell end through said outer skirt whereby said ribs are caused to be embedded into the shell ends.

* * * * *